G. E. KIRKPATRICK.
BISCUIT AND DOUGHNUT CUTTER.
APPLICATION FILED MAR. 1, 1920.
1,390,138. Patented Sept. 6, 1921.
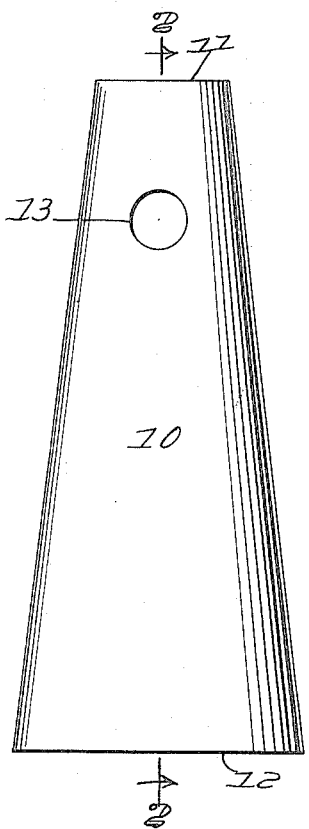
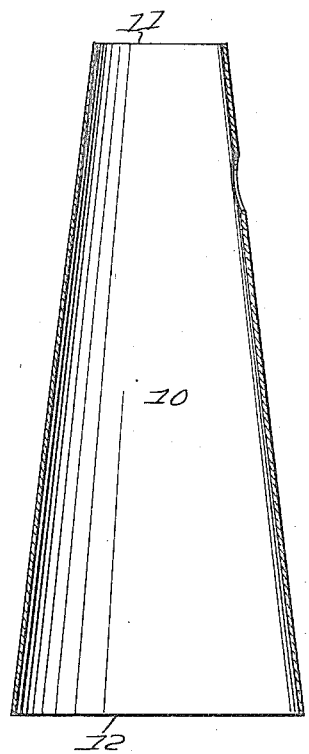
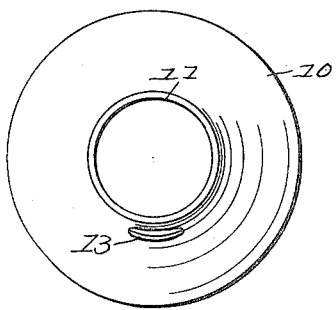
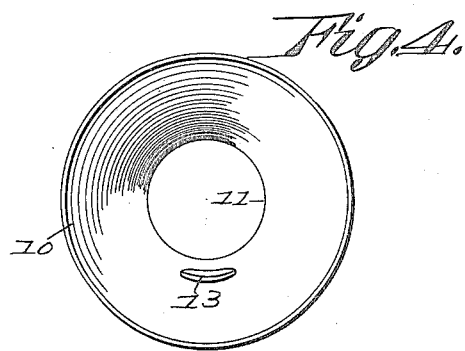

UNITED STATES PATENT OFFICE.

GRACE E. KIRKPATRICK, OF LEADWOOD, MISSOURI.

BISCUIT AND DOUGHNUT CUTTER.

1,390,138. Specification of Letters Patent. Patented Sept. 6, 1921.

Application filed March 1, 1920. Serial No. 362,314.

*To all whom it may concern:*

Be it known that I, GRACE E. KIRKPATRICK, a citizen of the United States of America, residing at Leadwood, in the county of Saint Francois and State of Missouri, have invented new and useful Improvements in Biscuit and Doughnut Cutters, of which the following is a specification.

The object of the invention is to provide a simple, convertible means for use in cutting biscuits and doughnuts from the rolled dough and under such conditions as to minimize the tendency of the cut-out portions of the dough to adhere to the surface of the cutter, and avoid the necessity of using different utensils for the purpose of making the tool cuts in forming the doughnut blank and with this object in view the invention consists in a construction and combination of parts of which a preferred embodiment is shown in the drawing, wherein:

Figure 1 is a side view of the device.

Fig. 2 is a sectional view on the plane indicated by the line 2—2 of Fig. 1.

Figs. 3 and 4 are respectively end views taken from the opposite ends of the device.

The cutter consists essentially of a trunco-conical tube 10 having terminal cutting edges 11 and 12 of different diameters suitable for forming the inside and outside cuts of a doughnut, it being obvious that either may be used in cutting biscuits according to the diameters desired for the same, and in the wall of the tube preferably adjacent to the smaller or reduced end is formed an opening 13 serving as a convenient means whereby the article may be suspended upon a nail or hook in position to afford the minimum opportunity for the accumulation of dust upon the surface thereof.

Inasmuch as both ends of the cutter are open it is obvious that in using the device the tendency for the blanks of dough to remain in adherence with the inner surfaces of the walls is reduced as distinguished from those cutters wherein the die is closed and the weight of the blank is resisted to a certain extent by the formation of a suction within the cutter. Inasmuch as the upper surface of the blank formed by the cutter is exposed to atmospheric pressure the gravity of the blank is sufficient under normal conditions to effect the displacement thereof when the cutter is raised after making a biscuit-cutting stroke.

The form of the cutter in trunco-conical shape, as shown, aside from possessing the advantages enumerated above as a biscuit cutting implement, also possesses decided advantages as a doughnut cutter. The larger end of the cutter is used for cutting the doughnut blank and the smaller end for removing the center. Being of tapering shape, when the smaller end removes the blank from the center the latter is forced up into the cutter and resting against the tapering inside walls is held therein by them and is removed from the doughnut blank with ease and ejected by merely inverting the cutter, when the center blank may drop out the larger end of the latter. In cutting the blank of the doughnut with the larger end of the cutter, it is not necessary that it be retained in the latter after the cutting stroke and the tendency of the cutter is to aid gravity in ejecting the blank when cutting the larger diameter of the same.

Also inasmuch as the interior of the cutter is unobstructed throughout, it being preferred that it be stamped or spun to provide a seamless structure, the possibility of accumulating or retaining foreign matter is minimized and the operation of cleansing and maintaining the device in an entirely sanitary condition is facilitated.

What is claimed is:

1. A convertible cutter of the type indicated consisting of a hollow trunco-conical tube of sheet material provided in its side wall adjacent to the reduced extremity thereof with a lateral opening, the tube being provided with cutting edges at both the large and small ends.

2. A convertible cutter of the type indicated consisting of a hollow trunco-conical tube of sheet material, the tube being provided with cutting edges at both the large and small ends.

In testimony whereof I affix my signature.

GRACE E. KIRKPATRICK.